United States Patent [19]

Mori

[11] Patent Number: 4,676,587

[45] Date of Patent: Jun. 30, 1987

[54] OPTICAL CONDUCTOR TUBE AND ITS CONNECTING MEMBER

[76] Inventor: Kei Mori, 3-16-3-501, Kaminoge, Setagaya-ku, Tokyo, Japan

[21] Appl. No.: 669,203

[22] Filed: Nov. 7, 1984

[30] Foreign Application Priority Data

Nov. 11, 1983 [JP] Japan .................. 58-212960

[51] Int. Cl.[4] .............................. G02B 6/36
[52] U.S. Cl. .................. 350/96.20; 350/96.10
[58] Field of Search ........... 350/96.10, 96.15, 96.20, 350/96.21

[56] References Cited

U.S. PATENT DOCUMENTS

| | | | |
|---|---|---|---|
| 4,118,100 | 10/1978 | Goell et al. | 350/96.20 |
| 4,166,672 | 9/1979 | Gilbert | 350/96.21 X |
| 4,361,380 | 11/1982 | Marazzi | 350/96.21 |
| 4,487,474 | 12/1984 | Nishie et al. | 350/96.21 |
| 4,580,874 | 4/1986 | Winter et al. | 350/96.21 |

Primary Examiner—William L. Sikes
Assistant Examiner—Akm E. Ullah
Attorney, Agent, or Firm—Jordan and Hamburg

[57] ABSTRACT

An optical conductor connection includes two axially aligned optical conductors to be connected, one of the optical conductors including a protecting tube having one longitudinal end portion which is an enlarged end portion having first threading thereon, and the other of the optical conductors including a protecting tube having another longitudinal end portion having second threading thereon. Each of the optical conductors further includes an optical conductor rod disposed axially in the respective protecting tube and spacers between the rod and the respective protecting tube for supporting the rod within the protecting tube in spaced relationship relative to the respective protecting tube. A sleeve is disposed between each protecting tube and rod of the two optical conductors and extends longitudinally between the two axially aligned optical conductors. A nut is threaded on the second threading and a coupling member has a radial portion which abuts the nut and a cylindrical portion which is disposed about the nut and which is threaded to the first threading.

5 Claims, 2 Drawing Figures ically with another optical conductor tube.

The present applicant has previously proposed various solar ray collecting devices in which solar rays are focused by a lens or the like and guided into an optical conductor, and further transmitted through it onto an optical desired place for use in illumination or for other purposes.

However, when the afore-mentioned solar ray collecting device is equipped on the rooftop of a building or the like in order to collect solar rays which are then transmitted through the optical conductor, for instance, to the northern side of a room on each floor, a core room, or an underground room, the optical conductor has to be very long to do the job. As a matter of fact, a plurality of optical conductors must be connected with each other to achieve a proper result. If those optical conductors are not perfectly connected with each other, the light rays are apt to leak from them at their connection and there is a fear of the destruction of the connecting member due to a poor connection.

SUMMARY OF THE INVENTION

It is an object of the present invention to provide an optical conductor tube and a connecting member capable of perfectly and firmly connecting them with each other.

It is another object of the present invention to provide an optical conductor tube and a connecting member preferable for connecting them in order on the rooftop of a building or the like and for letting them hang in a downward position.

Such an optical conductor tube made up of an optical conductor rod and a protecting tube for protecting it, in which the optical conductor rod is protected in such a manner that it is supported by the protecting tube at predetermined intervals around the optical conductor rod, and characterized in that the protecting tube has an enlarged end portion which is threaded on its outer circumferential surface and the protecting tube has another end portion which is threaded on its outer circumferential surface and is provided with a projecting stopper at a predetermined interval from such other end portion, and further a groove is formed axially in its inner circumferential surface.

The connecting member includes a sleeve tightly inserted into the space between the optical conductor rod and the protecting tube and having a part of it that projects and which engages the aforementioned groove in the inner circumferential surface, a nut member engaging with the threads at the aforementioned other end portion of the protecting tube, and a coupling member having a hole at one edge portion thereof into which the other edge portion of the protecting tube is inserted and further having a threaded portion on the inner circumferential surface of thereof which engages with the threaded portion at the enlarged end portion of said protecting tube.

The above and other features and advantages of the present invention will become apparent from the following detailed description which goes with the accompanying drawings.

DESCRIPTION OF THE PREFERRED EMBODIMENTS

Figure 1:
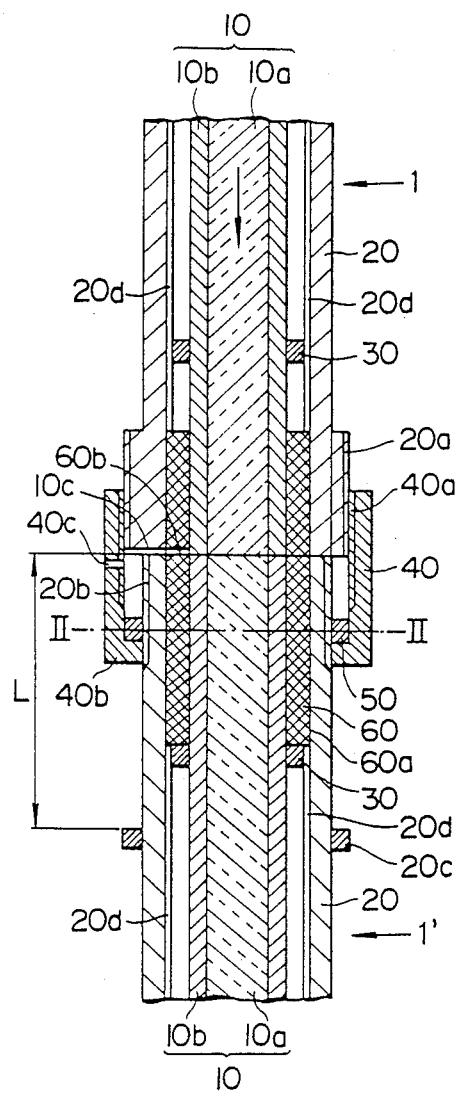
FIG. 1 is a cross-sectional view for explaining the main construction of an embodiment according to the present invention.
Figure 2:
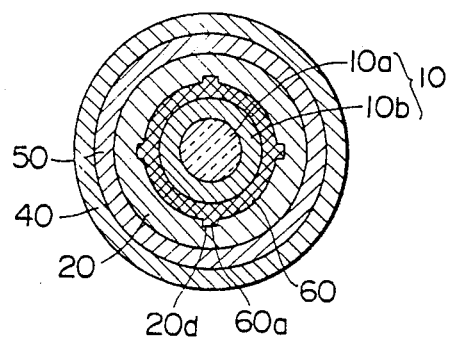
FIG. 2 is a cross-sectional view taken along the section line II—II of FIG. 1.

FIG. 1 is a cross-sectional view of an optical conductor tube in the connected state according to the present invention. FIG. 2 is a cross-sectional view taken along the section line II—II of FIG. 1. In FIG. 1, 1 and 1' are optical conductor tubes according to the present invention. The edge portion of the optical conductor tube 1 not shown in FIG. 1 is the same as the edge portion of the optical conductor tube 1' shown in FIG. 1, and that of the optical conductor tube 1' not shown in FIG. 1 is same as that of the optical conductor tube 1 as shown in FIG. 1. Namely, both of the optical conductor tubes 1 and 1' are quite the same.

The respective optical conductor tubes 1 and 1' consist of an optical conductor rod 10 and a protecting tube 20 for supporting the optical conductor rod 10 on the central axis thereof. The optical conductor rod 10 is supported by means of a spacer 30 on the central portion of the protection tube 20 at predetermined intervals. Furthermore, the optical conductor rod 10 consists of a core portion 10a and a cladding layer 10b.

At one edge portion of the optical conductor tubes 1 and 1', the protecting tube 20 is formed thickly and has a threaded portion 20a on the outer circumferential surface thereof as shown in the optical conductor tube 1 of FIG. 1. At another edge portion of the optical conductor tubes 1 and 1', a threaded portion 20b is formed on the outer circumferential surface of the protecting tube 20 as shown in the optical conductor tube 1' of FIG. 1 and a projecting stopper 20c is installed, leaving a predetermined distance L from the edge portion thereof. And one or more grooves 20d are formed along the axial direction of the protecting tube 20 in the area of the edge portion or for the entire length of the inner circumference thereof.

However, in the case where the solar ray collecting device is used on the rooftop of a building or the like and the solar rays collected on the rooftop of the building are to be transmitted through the respective optical conductors to the lower desired rooms, ducts for inserting the optical conductors are first installed in the walls of the building. The aforementioned optical conductors are then inserted into the ducts, in order, from the rooftop of the building and hang down to the desired floors. In the case where the optical conductor rod is used as above-mentioned, the optical conductor rod is not bent. It is therefore necessary to obtain the desired length of optical conductor rod by connecting a desired number of optical conductor rods together.

The above-described optical conductor tube according to the present invention, is preferable for connecting it with another by inserting it into the suggested ducts. The connection is performed as follows.

Now, suppose that the edge portion of the optical conductor tube 1' not shown in FIG. 1 hangs down into the duct and the connecting portion of it as shown in FIG. 1 is situated just at the same level on the rooftop of the building. In such circumstances the workers first insert a coupling member 40 into the optical conductor tube 1' from the upper side. A projecting stopper 20c is fixedly mounted on the outer circumferential surface of the protecting tube 20 in order to prevent the coupling member 40 from falling by mistake or by accident to the ground. Therefore, the workers can perform their work very easily.

In such a manner, after inserting the coupling member 40, a nut 50 is screwed onto the threaded portion 20b of the protecting tube 20, for instance, onto the location shown in FIG. 1. Secondly, the workers insert a sleeve 60 into the space between the optical conductor rod 10 and the protecting tube 20 from the upper side of the optical conductor tube 1'. A projection 60a engaging with the groove 20d of the aforementioned optical conductor tubes 1 and 1' is formed on the outer circumferential surface of the sleeve 60 along the axial direction of the optical conductor tube so as to fit in the groove 20d. The sleeve 60 is tightly inserted into the protecting tube 20 in such a manner that the projection 60a of the sleeve 60 moves along the groove 20d formed on the inner surface of the protecting tube 20 of the optical conductor tube 1'.

After placing the optical conductor tube and other parts as described, the optical conductor tube 1 is pushed down from the upper side of the sleeve 60 as shown in FIG. 1 (showing the relationship of the optical conductor tube 1 and 1') by letting the groove 20d of the protecting tube 20 engage with the projection 60a of the sleeve 60. Next, by screwing a threaded portion 40a of the coupling member 40 on a threaded portion 20a of the protecting tube 20 of the optical conductor tube 1, the coupling member 40 fastens both of the optical conductor tubes 1 and 1' in order to unite them until the lower portion 40b of the coupling member 40 abuts on the nut 50 performing as a stopper, thus the optical conductor tubes 1 and 1' are firmly connected with each other as shown in FIG. 1.

Namely, both of the optical conductor tubes 1 and 1' are prevented from being bent by means of the sleeve 60, and they are further prevented from expanding and contracting in the direction of the axis by means of the coupling member 40. Especially in the case of firmly fixing the optical conductor rods 10a with each other by use of optical paste, there is no fear of destruction of the fixed layer portion because of expansion. As a consequence, no crack appears on the fixed layer portion due to any damage to it and the light rays do not disperse or reflect at any place in the fixed layer portion containing air that has entered from the outside. As a result light energy can be effectively transmitted.

Furthermore, when the optical conductor tube 1 is connected with the optical conductor tube 1' by an engagement action with the sleeve 60 as mentioned heretofore, it is necessary to push out the air that is in the space surrounded by the sleeve 60 (side surface) and the upper surface of the optical conductor rod 10 of the optical conductor tube 1' (bottom surface). For this reason, the holes 40c and 60b for getting rid of the air are formed on a part of the side walls of the coupling member 40 and the sleeve 60, respectively. In addition to those holes, a groove 10c for disposing of the air is formed at the lower portion of the protecting tube 20 of the optical conductor tube 1.

After connecting the optical conductor tubes 1 and 1' with each other as mentioned above, the optical conductor tubes 1 and 1' are inserted in a downward position. The edge portion of the optical conductor tube 1, not shown in FIG. 1, is connected with a new optical conductor tube in the same manner as mentioned before. In a similar way, by repeating the same connecting procedure, the tip end portion of the optical conductor tube is lowered down to the desired floor.

As is apparent from the foregoing description, according to the present invention, it is possible to provide optical conductor tubes that are better for connecting with each other, in order, on the rooftop of a building or the like and for hanging downwardly and to further provide a connecting member capable of surely or reliably connecting those optical conductor tubes with each other, and whereby any bending stress, compression stress, or pulling stress are not applied to the optical conductor rod itself due to its efficient design.

What is claimed is:

1. An optical conductor tube connector comprising two axially aligned optical conductor means to be connected, one of said optical conductor means comprising a protecting tube having one longitudinal end portion which is an enlarged end portion, first thread means on said enlarged end portion, the other of said two optical conductor means comprising a protecting tube having another longitudinal end portion, second thread means on said other longitudinal end portion, said one longitudinal end portion being juxtaposed to said other longitudinal end portion, each of said optical conductor means further comprising an optical conductor rod disposed axially in the respective protecting tube and spacer means between the rod and the respective protecting tube for supporting the rod within the protecting tube in spaced relationship relative to the respective protecting tube, a sleeve disposed between each protecting tube and rod of each of said two optical conductor means and extending longitudinally between said two axially aligned optical conductor means, interengaging means interengaged between said sleeve and protecting tubes, a nut threaded on said second thread means, and a coupling member having a cylindrical portion and a radial portion extending radially inwardly from said cylindrical portion, said radial portion abutting said nut, said cylindrical portion being disposed about said nut and being threaded to said first thread means.

2. An optical conductor tube connection according to claim 1 further comprising air-release means in said sleeve and said coupling member, said air-release means being defined by a hole in said sleeve and in said coupling member.

3. An optical conductor tube connection according to claim 2, wherein said hole in said sleeve and in said coupling member are radially disposed, said air-release means further comprising a groove in the longitudinal end of said enlarged end portion of said protecting tube.

4. An optical conductor tube connection according to claim 1, wherein said interengaging means comprises a plurality of longitudinally extending projections on said sleeve which are disposed within a plurality of aligned longitudinally extending grooves in said protecting tubes.

5. An optical conductor tube connection comprising two axially aligned optical conductor means to be connected, one of said optical conductor means comprising a protecting tube having one longitudinal end portion which is an enlarged end portion, first thread means on said enlarged end portion, the other of said two optical conductor means comprising a protecting tube having another longitudinal end portion, second thread means on said other longitudinal end portion, said one longitudinal end portion being juxtaposed to said other longitudinal end portion, each of said optical conductor means further comprising an optical conductor rod disposed axially in the respective protecting tube and spacer means between the rod and the respective protecting tube for supporting the rod within the protecting tube in spaced relationship relative to the respective protecting tube, a sleeve disposed between each protecting tube and rod of each of said two optical conductor means and extending longitudinally between said two axially aligned optical conductor means, a plurality of longitudinally extending projections projecting from the outer circumference of said sleeve, a plurality of longitudinally extending grooves within the inner circumference of said protecting tubes, said projections being received within said grooves, a nut threaded on said second thread means, a coupling member having a cylindrical portion and a radial portion extending radially inwardly from one longitudinal end of said cylindrical portion, said radial portion abutting said nut, said cylindrical portion being disposed about said nut and being threaded to said first thread means, and air-release means in said sleeve and in said coupling member for releasing air during assembly of the connection between the two optical conductor means.

* * * * *